(12) United States Patent
Avataneo et al.

(10) Patent No.: US 10,513,593 B2
(45) Date of Patent: Dec. 24, 2019

(54) FLUOROELASTOMER COMPOSITION

(71) Applicant: SOLVAY SPECIALTY POLYMERS ITALY S.P.A., Bollate, MI (US)

(72) Inventors: Marco Avataneo, Senago (IT); Matteo Fantoni, Vanzaghello (IT); Luca Cirillo, Arese (IT); Stefano Bossolo, Parabiago (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 0 days.

(21) Appl. No.: 15/523,023

(22) PCT Filed: Oct. 29, 2015

(86) PCT No.: PCT/EP2015/075099
§ 371 (c)(1),
(2) Date: Apr. 28, 2017

(87) PCT Pub. No.: WO2016/066741
PCT Pub. Date: May 6, 2016

(65) Prior Publication Data
US 2017/0313849 A1 Nov. 2, 2017

(30) Foreign Application Priority Data
Oct. 31, 2014 (EP) .................................... 14191326

(51) Int. Cl.
*C08K 3/04* (2006.01)
*C08K 5/00* (2006.01)
(Continued)

(52) U.S. Cl.
CPC ............ *C08K 5/0025* (2013.01); *B29C 35/00* (2013.01); *B29C 43/003* (2013.01);
(Continued)

(58) Field of Classification Search
CPC ..... C08L 27/18; C08F 214/26; C08J 2327/16; C08J 2327/18; C08J 3/24
See application file for complete search history.

(56) References Cited

U.S. PATENT DOCUMENTS

| 4,035,565 A | 7/1977 | Apotheker et al. |
| 4,243,770 A | 1/1981 | Tatemoto et al. |
(Continued)

FOREIGN PATENT DOCUMENTS

| EP | 199138 A2 | 10/1986 |
| EP | 769521 A1 * | 4/1997 |
(Continued)

*Primary Examiner* — Mark S Kaucher

(57) ABSTRACT

The invention pertains to a fluoroelastomer composition comprising:
at least one fluoroelastomer [perfluoroelastomer (A)], said fluoroelastomer (A) comprising iodine and/or bromine atoms and having a backbone comprising:
recurring units derived from tetrafluoroethylene (TFE);
recurring units derived from at least one perfluorinated monomer selected from the group consisting of:
perfluoroalkylvinylethers complying with formula $CF_2=CFOR_{f1}$ in which Rn is a $C_1$-$C_6$ perfluoroalkyl (monomers of this type being referred to, herein after, as PAVE), e.g. —$CF_3$, —$C_2F_5$, —$C_3F_7$;
perfluoro-oxyalkylvinylethers complying with formula $CF_2=CFOX_0$, in which $X_0$ can be (i) a $C_1$-$C_{12}$ perfluorooxyalkyl having one or more ether groups, e.g. —$C_2F_5$—O—$CF_3$; or (ii) a group of formula —$CF_2OR_{f2}$ in which $R_{f2}$ is a $C_1$-$C_6$ perfluoroalkyl, e.g. —$CF_3$, —$C_2F_5$, —$C_3F_7$ (monomers of this type being referred to, herein after, as MOVE);
recurring units derived from vinylidene fluoride (VDF) in an amount of up to 30% by moles, with respect to the total moles of recurring units; and
optionally, recurring units derived from at least one perfluorinated $C_3$-$C_8$ alpha-olefin, in an amount of up to 5% moles;
optionally, recurring units derived from at least one fluorine-free alpha-olefin, in an amount of up to 10% moles;
from 0.5 to 5 weight parts, per 100 parts by weight of said fluoroelastomer (A), of at least one polyunsaturated compound;
from 0.1 to 3 weight parts, per 100 parts by weight of said fluoroelastomer (A), of at least one organic peroxide;
from 0.1 to 3 weight parts, per 100 parts by weight of said fluoroelastomer (A), of at least one organic base [base (B)] selected from the group consisting of: (i) non-aromatic primary amines or amides complying with general formula (B1m) or (B1d):

$$R_{bm}-[C(O)]_t-NH_2 \quad (B1m)$$

$$H_2N-[C(O)]_t-R_{dm}-[C(O)]_{t'}-NH_2 \quad (B1d)$$

wherein:
each of t, t' and t", equal to or different from each other and at each occurrence is zero or 1;
$R_{bm}$ is a monovalent hydrocarbon non-aromatic group having 12 to 30 carbon atoms;
$R_{bm}$ is a divalent hydrocarbon non-aromatic group having 6 to 30 carbon atoms; and (ii) cycloaliphatic secondary or tertiary amines complying with general formula (B2m) or (B2d) wherein:
Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;
Cy' represent a trivalent aliphatic group comprising at least 5 carbon atoms, optionally comprising one or more than one ethylenically unsaturated double bond, and optionally comprising one or more catenary nitro-
(Continued)

gen atoms, forming a cycle with the nitrogen atom which is connected thereto.

20 Claims, No Drawings

(51) Int. Cl.
    *B29C 48/00*     (2019.01)
    *B29C 35/00*     (2006.01)
    *B29C 43/00*     (2006.01)
    *B29C 45/00*     (2006.01)
    *B29K 27/12*     (2006.01)

(52) U.S. Cl.
    CPC ........ B29C 45/0001 (2013.01); B29C 48/022 (2019.02); C08K 3/04 (2013.01); *B29K 2027/12* (2013.01)

(56) References Cited

U.S. PATENT DOCUMENTS

| | | | |
|---|---|---|---|
| 4,564,662 | A | 1/1986 | Albin |
| 4,694,045 | A | 9/1987 | Moore |
| 4,745,165 | A | 5/1988 | Arcella et al. |
| 4,943,622 | A | 7/1990 | Naraki et al. |
| 5,173,553 | A | 12/1992 | Albano et al. |
| 6,465,576 | B1 * | 10/2002 | Grootaert ............ C08F 214/262 525/199 |
| 2013/0109797 | A1 * | 5/2013 | Fantoni .................. C08L 27/18 524/366 |

FOREIGN PATENT DOCUMENTS

| | | |
|---|---|---|
| WO | 9502634 A1 | 1/1995 |
| WO | 2012049093 A1 | 4/2012 |
| WO | 2014206833 A1 | 12/2014 |

* cited by examiner

FLUOROELASTOMER COMPOSITION

CROSS-REFERENCE TO RELATED APPLICATION

This application is a U.S. national stage entry under 35 U.S.C. § 371 of International Application No. PCT/EP2015/075099 filed Oct. 29, 2015, which claims priority to European patent application No. 14191326.9 filed on Oct. 312014. The entire contents of these applications are explicitly incorporated herein by this reference.

TECHNICAL FIELD

This invention pertains to certain fluoroelastomer curable blends, to a method of using the same for fabricating shaped articles and to cured articles there from.

BACKGROUND ART

Fluoroelastomers are a class of high-performance materials with a diverse range of applications encompassing O-rings, valve stem seals, shaft seals, gaskets and hoses in chemical processing industry (CPI).

It is also understood that properties of final vulcanized parts made from fluoroelastomers are greatly influenced by the curing system employed, with peroxide-based curing being considered as delivering higher performances over bis-phenol-based ionic curing.

In peroxide-based curing, a peroxide is added to the fluoroelastomer comprising, either as pendant groups in recurring units of the main chain, or as end-groups, certain cure sites able to react under radical condition, and to a polyfunctional unsaturated compound. Under the effect of heat, the peroxide generates radicals which promote reactions of the fluoroelastomer chain, activated through the cure sites, with the polyfunctional unsaturated compound for yielding a cured mass, with chemically interconnected polymer chains.

Nevertheless, achieving high thermal rating remains a challenging target, even when using peroxide-based formulations.

In this field there is hence a continuous quest for fluoroelastomer curable blends offering an advantageous balance of properties, and more specifically high thermal stability and outstanding steam resistance, and which are easily accessible at reasonable costs.

WO 95/02634 (E.I. DUPONT DE NEMOURS AND COMPANY) 26 Jan. 1995 discloses fluoroelastomer compositions with low concentrations of extractable metal species. The fluoroelastomer may be a perfluoroelastomer or a vinylidene-fluoride-based fluoroelastomer; the compounds is cured by peroxidic route, combining the same with an organic peroxide, a co-agent and an organic acid acceptor, which may be, inter alia, octadecyl amine. Examples 5 and 6 pertains to a peroxide-curable compound based on a copolymer having a composition of 38% perfluoromethylvinylether, 35% vinylidene fluoride, 26% tetrafluoroethylene, 1% 4-bromotrifluoro-3,3,4,4-tetrafluorobutene, and iodine, further compounded with 0.5 phr of octadecylamine. Example 7 pertains to a peroxide-curable compound based on a copolymer having a composition of 50% vinylidene fluoride, 29% hexafluoropropylene, 20% tetrafluoroethylene, 0.6% 4-bromotrifluoro-3,3,4,4-tetrafluorobutene, and 0.2% iodine, further compounded with 0.5 phr of octadecylamine. In all these examples, the fluoroelastomers used comprise a significant amount of recurring units derived from vinylidene fluoride, so that sensitivity to bases at high temperature is the predominant phenomenon, preventing amines to positively influence thermal rating.

WO 2012/049093 (SOLVAY SPECIALTY POLYMERS ITALY, S.P.A.) 19 Apr. 2012 discloses iodine-containing VDF/HFP/TFE fluorelastomeric copolymers comprising at least 35% moles of recurring units derived from VDF, which are cured via peroxidic route, and which may be combined in curable compounds with acid acceptors like notably 1,8-dimethylaminonaphthalene and octadecylamine.

SUMMARY OF INVENTION

The Applicant has now found that a particular combination of cross-linking agents and certain organic basic compound, in given amounts, is effective in the peroxide curing of certain fluoroelastomers having well-defined amount of hydrogenated sequences and comprising recurring units derived from vinyl ether-type fluoromonomers, and provides for cured gum possessing a particularly favourable balance of thermal resistance and availability/cost, so that target performances for high temperature ratings can be achieved through the use of this curative at competitive costs.

The invention thus pertains to a fluoroelastomer composition comprising:

at least one fluoroelastomer [perfluoroelastomer (A)], said fluoroelastomer (A) comprising iodine and/or bromine atoms and having a backbone comprising:

recurring units derived from tetrafluoroethylene (TFE);

recurring units derived from at least one perfluorinated monomer selected from the group consisting of:

perfluoroalkylvinylethers complying with formula $CF_2=CFOR_{f1}$ in which $R_{f1}$ is a $C_1$-$C_6$ perfluoroalkyl (monomers of this type being referred to, herein after, as PAVE), e.g. $-CF_3$, $-C_2F_5$, $-C_3F_7$;

perfluoro-oxyalkylvinylethers complying with formula $CF_2=CFOX_0$, in which $X_0$ can be (i) a $C_1$-$C_{12}$ perfluorooxyalkyl having one or more ether groups, e.g. $-C_2F_5-O-CF_3$; or (ii) a group of formula $-CF_2OR_{f2}$ in which $R_{f2}$ is a $C_1$-$C_6$ perfluoroalkyl, e.g. $-CF_3$, $-C_2F_5$, $-C_3F_7$ (monomers of this type being referred to, herein after, as MOVE);

recurring units derived from vinylidene fluoride (VDF) in an amount of up to 30% by moles, with respect to the total moles of recurring units; and optionally, recurring units derived from at least one perfluorinated $C_3$-$C_8$ alpha-olefin, in an amount of up to 5% moles;

optionally, recurring units derived from at least one fluorine-free alpha-olefin, in an amount of up to 10% moles;

from 0.5 to 5 weight parts, per 100 parts by weight of said fluoroelastomer (A), of at least one polyunsaturated compound;

from 0.1 to 3 weight parts, per 100 parts by weight of said fluoroelastomer (A), of at least one organic peroxide;

from 0.1 to 3 weight parts, per 100 parts by weight of said fluoroelastomer (A), of at least one organic base [base (B)] selected from the group consisting of:

(i) non-aromatic primary amines or amides complying with general formula (B1m) or (B1d):

   (B1m)

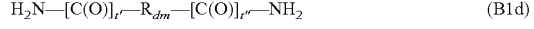   (B1d)

wherein:
each of t, t' and t", equal to or different from each other and at each occurrence is zero or 1;

$R_{bm}$ is a monovalent hydrocarbon non-aromatic group having 12 to 30 carbon atoms;

$R_{bm}$ is a divalent hydrocarbon non-aromatic group having 6 to 30 carbon atoms; and (ii) cycloaliphatic secondary or tertiary amines complying with general formula (B2m) or (B2d):

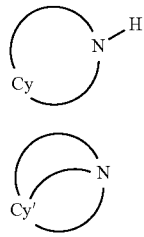

wherein:
- Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;
- Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto.

The Applicant has surprisingly found that the use of an organic base (B), as above detailed, in a peroxide-curable fluoroelastomer formulation, despite the presence in the backbone of the fluoroelastomer (A) raw gum of moieties of formula —$CH_2$—$CF_2$— derived from VDF and otherwise known for possibly undergoing dehydrofluorination phenomena in a basic medium, and despite the presence of moieties of formula —$CF_2$—$CF(OR_F)$—, with $R_F$ being perfluoro(oxy)alkyl, generally known as undergoing base-catalyzed decomposition phenomena, is nonetheless effective in ensuring adequate curing rates and outstanding mechanical and sealing properties, in particular at high temperatures, and excellent steam resistance.

Among bases of formulae (B1m) and (B1d), those wherein:

$R_{bm}$ is a monovalent aliphatic linear group having 12 to 30 carbon atoms, possibly comprising one or more than one ethylenically unsaturated double bond; and $R_{bm}$ is a divalent aliphatic linear group having 6 to 30 carbon atoms, possibly comprising one or more than one ethylenically unsaturated double bond, are particularly preferred.

Among the said non-aromatic primary amines or amides, mention can be particularly made of:

octadecylamine of formula $CH_3(CH_2)_{17}$—$NH_2$;

erucamide of formula $H_2N$—$C(O)$—$(CH_2)_{11}$—$CH=CH$—$(CH_2)_7CH_3$;

oleamide of formula $H_2N$—$C(O)$—$(CH_2)_7$—$CH=CH$—$(CH_2)_7CH_3$;

hexamethylenediamine of formula $H_2N$—$(CH_2)_6$—$NH_2$.

Among the said cycloaliphatic secondary or tertiary amines, mention can be made of:

1,8-diazabicycloundec-7-ene (DBU) of formula:

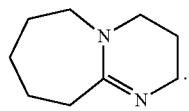 [SMILES: C1CCC2=NCCCN2CC1 ; "."]

The polyunsaturated compounds which can be used in the curable composition of the invention are compounds comprising more than one carbon-carbon double bond.

Suitable polyunsaturated compounds are notably compounds comprising at least two, and in certain embodiments at least three carbon-carbon double bonds.

Polyunsaturated compounds comprising (meth)allyl groups of formula —$CH(R_{al})$—$CH=CH_2$, with $R_{al}$ being H or methyl, can be used; exemplary embodiments thereof are notably triallyl cyanurate; triallyl isocyanurate (TAIC); tri(methallyl)isocyanurate; tris(diallylamine)-s-triazine; triallyl phosphite; N,N-diallylacrylamide; hexaallylphosphoramide; N,N,N',N'-tetraallylmalonamide; N,N,N',N'-tetraallylterephthalamide;

According to other embodiments, polyunsaturated compounds comprising vinyl groups of formula —$CH=CH_2$ can be used; exemplary embodiments thereof are notably trivinyl isocyanurate; 2,4,6-trivinyl methyltrisiloxane.

According to certain embodiments, the polyunsaturated compound is selected from the group consisting of bis-olefins [bis-olefin (OF)] having general formula:

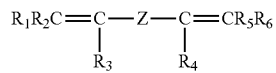

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical.

The bis-olefin (OF) is preferably selected from the group consisting of those complying with formulae (OF-1), (OF-2) and (OF-3):

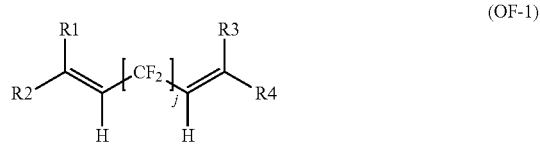

wherein j is an integer between 2 and 10, preferably between 4 and 8, and R1, R2, R3, R4, equal or different from each other, are H, F or $C_{1-5}$ alkyl or (per)fluoroalkyl group;

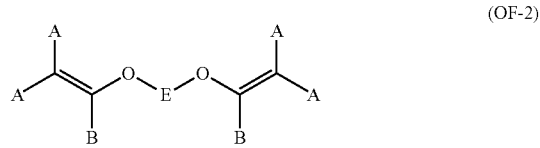

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF—O—(CF_2)_5—O—CF=CF_2$.

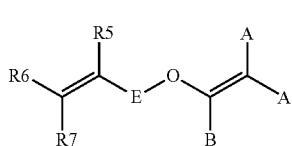

(OF-3)

wherein E, A and B have the same meaning as above defined; R5, R6, R7, equal or different from each other, are H, F or $C_{1-5}$ alkyl or (per)fluoroalkyl group.

The bis-olefin (OF) is more preferably a compound of formula (OF1), as above detailed, and even more preferably a compound of formula $CH_2=CH—(CF_2)_n—CH=CH_2$, with n being an integer in the range of 4 to 6.

The amount of polyfunctional compound ranges from 0.5 to 5 weight parts per 100 parts by weight of fluoroelastomer (A).

For enabling obtaining sufficient cross-linking, it is generally preferred to have in the composition amounts of polyfunctional compound of at least 1, preferably at least 1.2 weight parts per 100 parts by weight of fluoroelastomer (A).

Still, useful amounts of polyfunctional compound are of generally less than 5, more preferably less than 4, still more preferably less than 3 weight parts per 100 parts by weight of fluoroelastomer (A).

For the purposes of this invention, the term "fluoroelastomer" [fluoroelastomer (A)] is intended to designate a fluoropolymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C.

The fluorine-free alpha-olefin is generally selected from the group consisting of ethylene (E), propylene (P), 1-butene, 1-hexene, with E being generally preferred.

The perfluorinated $C_3$-$C_8$ alpha-olefin is generally selected from the group consisting of hexafluoropropylene (HFP), perfluoro-1-butene, with HFP being generally preferred.

The fluoroelastomer (A) is preferably selected among those having a backbone comprising (preferably consisting essentially of):
  recurring units derived from TFE in an amount of 30 to 70% moles;
  recurring units derived from at least one perfluorinated monomer selected from the group consisting of PAVE and MOVE monomers, as above detailed, in an amount of 25 to 40% moles;
  recurring units derived from VDF in an amount of 1 to 25% moles;
  optionally, recurring units derived from ethylene (E) in an amount from 0 to 5% moles;
  optionally, recurring units derived from hexafluoropropylene (HFP) in an amount from 0 to 5% moles;
  optionally, recurring units derived from at least one bis-olefin [bis-olefin (OF)] having same features, as above detailed.

The bis-olefin (OF) can be present in the fluoroelastomer backbone in an amount of 0 to 5% moles; when present, its amount is generally of 0.01 to 3% moles, preferably of 0.1 to 2% moles.

Defects or other impurities might be comprised in the fluoroelastomer (A) without this substantially affecting its properties.

Among specific monomer compositions of fluoroelastomers (A) suitable for the purpose of the invention, mention can be made of fluoroelastomers having the following monomer compositions (in mol %):
(i) tetrafluoroethylene (TFE) 40-65%, perfluoroalkyl vinyl ethers (PAVE) 20-50%, vinylidene fluoride (VDF): 10-25%; bis-olefin (OF): 0-5%; hexafluoropropylene (HFP): 0-5%;
(ii) tetrafluoroethylene (TFE) 40-65%, perfluoroalkyl vinyl ethers (PAVE) 20-45%, vinylidene fluoride (VDF): 10-25%; ethylene (E): 1-5%; bis-olefin (OF) 0-5%; hexafluoropropylene (HFP): 0-5%.

The fluoroelastomer (A) can be prepared by any known method, such as emulsion or micro-emulsion polymerization, suspension or micro-suspension polymerization, bulk polymerization and solution polymerization.

According to certain preferred embodiments of the invention, the fluoroelastomer (A) comprises iodine and/or bromine atoms; the selection among iodine/bromine is not particularly critical, provided that they ensure adequate reactivity in curing. Iodine is nevertheless generally preferred.

These iodine or bromine atoms can be comprised in the fluoroelastomer (A) as pending groups bound to the backbone of the fluoroelastomer (A) polymer chain (by means of incorporation in the fluoroelastomer (A) chain of recurring units derived from monomers having iodine and/or bromine atoms (referred to as cure-site containing recurring units) and/or can be comprised as terminal groups of said polymer chain.

Among cure-site containing recurring units, mention can be notably made of (CSM-1) iodine or bromine containing monomers of formula:

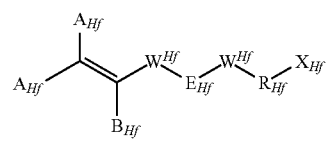

wherein each of $A_{Hf}$, equal to or different from each other and at each occurrence, is independently selected from F, and Cl; $B_{Hf}$ is any of F, Cl, and $OR^{Hf}_B$, wherein $R^{Hf}_B$ is a branched or straight chain perfluoroalkyl radical; each of $W^{Hf}$ equal to or different from each other and at each occurrence, is independently a covalent bond or an oxygen atom; $E_{Hf}$ is a perfluorinated divalent group having 2 to 10 carbon atom; $R_{Hf}$ is a branched or straight chain perfluorinated alkyl radical; and $X_{Hf}$ is a halogen atom selected from the group consisting of Iodine and Bromine.

Among cure-site containing monomers of type (CSM1), preferred monomers are those selected from the group consisting of: (CSM1-A) iodine-containing perfluorovinylethers of formula:

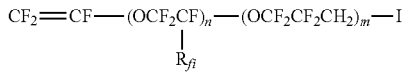

with m being an integer from 0 to 5 and n being an integer from 0 to 3, with the provisio that at least one of m and n is different from 0, and $R_{fi}$ being F or $CF_3$; (as notably described in U.S. Pat. No. 4,745,165 (AUSIMONT SPA) 17 May 1988, U.S. Pat. No. 4,564,662 (MINNESOTA MINING & MFG [US]) 14 Jan. 1986 and EP 199138 A (DAIKIN IND LTD) 29 Oct. 1986); and (CSM-1B) iodine-containing ethylenically unsaturated compounds of formula:

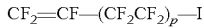

wherein p is an integer from 1 to 5;
(CSM-1C) bromo and/or iodo alpha-olefins containing from 2 to 10 carbon atoms such as bromotrifluoroethylene or bromotetrafluorobutene described, for example, in U.S. Pat. No. 4,035,565 (DU PONT) 12 Jul. 1977 or other compounds bromo and/or iodo alpha-olefins disclosed in U.S. Pat. No. 4,694,045 (DU PONT) 15 Sep. 1987.

According to a first embodiment, the iodine and/or bromine atoms are comprised as pending groups bound to the backbone of the perfluoroelastomer polymer chain. The perfluoroelastomer according to this embodiment generally comprises recurring units derived from iodine or bromine containing monomers (CSM-1) in amounts of 0.05 to 5 mol per 100 mol of all other recurring units of the perfluoroelastomer (A), so as to advantageously ensure iodine and/or bromine weight content to meet requirement for achieving adequate curing rate and crosslinking density.

According to a second preferred embodiment, the iodine and/or bromine atoms are comprised as terminal groups of the perfluoroelastomer (A); the perfluoroelastomer according to this embodiment is generally obtained by addition to the polymerization medium during perfluoroelastomer manufacture of anyone of:
iodinated and/or brominated chain-transfer agent(s); suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and
alkali metal or alkaline-earth metal iodides and/or bromides, such as described notably in U.S. Pat. No. 5,173,553 (AUSIMONT SRL) 22 Dec. 1992.

The perfluoroelastomer (A) of the invention comprises advantageously iodine and/or bromine atoms in an amount of 0.001 to 10% wt, with respect to the total weight of the perfluoroelastomer (A).

According to this embodiment, for ensuring acceptable reactivity it is generally understood that the content of iodine and/or bromine in the perfluoroelastomer (A) should be of at least 0.05% wt, preferably of at least 0.1% weight, more preferably of at least 0.15% weight, with respect to the total weight of perfluoroelastomer (A).

On the other side, amounts of iodine and/or bromine not exceeding preferably 7% wt, more specifically not exceeding 5% wt, or even not exceeding 4% wt, with respect to the total weight of perfluoroelastomer (A), are those generally selected for avoiding side reactions and/or detrimental effects on thermal stability.

The curable composition of the invention comprises at least one organic peroxide.

Among most commonly used organic peroxides, mention can be made of dialkyl peroxides, for instance di-tert-butyl peroxide, 2,5-dimethyl-2,5-bis(tert-butylperoxy)hexane, bis (1,1-diethylpropyl)peroxide, bis(1-ethyl-1-methylpropyl) peroxide, 1,1-diethylpropyl-1-ethyl-1-methylpropyl-peroxide, 2,5-dimethyl-2,5-bis(tert-amylperoxy)hexane; dicumyl peroxide; dibenzoyl peroxide; di-tert-butyl perbenzoate; bis [1,3-dimethyl-3-(tert-butylperoxy)butyl] carbonate.

The amount of peroxide ranges from 0.1 to 10 weight parts per 100 parts by weight of fluoroelastomer (A).

For achieving reasonable curing rates, it is generally preferred to have in the composition amounts of peroxide of at least 0.5, preferably at least 0.8 weight parts per 100 parts by weight of fluoroelastomer (A).

Equally, to the sake of efficiency, amount of peroxide is of generally less than 3, more preferably less than 2.5, still more preferably less than 2 weight parts per 100 parts by weight of fluoroelastomer (A).

The fluoroelastomer composition of the invention may additionally comprise other ingredients, such as notably:
(a) a metal compound, generally in amounts of between 1 and 15, and preferably between 2 and 10 weight parts per 100 parts of fluoroelastomer (A), typically selected from the group consisting of (i) oxides and hydroxides of divalent metals, for instance Mg, Zn, Ca or Pb, (ii) salts of a weak acid, for instance Ba, Na, K, Pb, Ca stearates, benzoates, carbonates, oxalates or phosphites, and (iii) mixtures of (i) and (ii);
(b) conventional additives, selected generally from the group consisting of fillers (e.g. carbon black), thickeners, pigmen-ts, antioxidants, stabilizers, processing aids, and the like, in amounts of generally 5 and 150, preferably between 10 and 100 weight parts, more preferably between 20 and 60 weight parts, per 100 parts of fluoroelastomer (A).

It is generally understood that the fluoroelastomer composition of the invention comprises no other ingredients beside those above listed; in other terms, the inventive composition generally consists essentially of the fluoroelastomer (A), the organic peroxide, the polyfunctional compound, the base (B), and optionally metal compounds, and conventional additives, as above detailed.

The invention also pertains to a method of using the fluoroelastomer composition, as above described, for fabricating shaped articles.

The fluoroelastomer composition can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer (A) into a finished article made of non-tacky, strong, insoluble, chemically and thermally resistant cured fluoroelastomer.

Finally, the invention pertains to cured articles obtained from the fluoroelastomer composition, as above detailed.

The cured articles can be notably pipes, joints, O-ring, hose, and the like.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

Raw Materials

Fluoroelastomer A (FKM-A, herein after) is a VDF/TFE/perfluoromethylvinylether (MVE) having monomer composition, in moles %: 15% VDF/46% TFE/39% MVE; further comprising recurring units derived from a bis-olefin of formula $CH_2=CH-(CF_2)_6-CH=CH_2$, and iodine cure sites, commercially available from Solvay Specialty Polymers Italy, S.p.A.

Fluoroelastomer B (FKM-B, herein after) is a VDF/TFE/MVE/ethylene (E) copolymer having monomer composition, in moles %: 38% VDF/30% TFE/10% HFP/18% MVE/4% E; further comprising recurring units derived from a bis-olefin of formula $CH_2=CH-(CF_2)_6-CH=CH_2$, and iodine cure sites, commercially available from Solvay Specialty Polymers Italy, S.p.A.

Fluoroelastomer C (FKM-C, herein after) is a VDF/TFE/HFP fluoroelastomer, having monomer composition, in moles %: 70.5% VDF/11% TFE/18.5% HFP, further comprising recurring units derived from a bis-olefin of formula $CH_2=CH-(CF_2)_6-CH=CH_2$, and iodine cure sites, commercially available from Solvay Specialty Polymers Italy, S.p.A.

Curing, Mechanical and Thermal Resistance Property Determination on Cured Samples Fluoroelastomers were compounded with the additives as detailed in following table in a Brabender mixer. Plaques and O-rings (size class=214) have been cured in a pressed mould and then post-treated in an air circulating oven in conditions (time, temperature) below specified. The compression set (C-SET) has been determined on O-ring, specimen standard AS568A (type 214), according to the ASTM D 395, method B, either after 48 hours at 300° C., or after 70 hours at 280° C. Results are summarized in the following tables.

Tests Carried Out With FKM A and Basic Compound (B-1)

Curable compounds have been prepared mixing:
100 phr of FKM A;
1.2 phr of a bis-olefin of formula $CH_2=CH-(CF_2)_6-CH=CH_2$;
1 phr of neat 2,5-dimethyl-2,5-di(t-butylperoxy)hexane ($C_{16}H_{34}O_4$), commercially available as LUPEROX® 101 from Akzo Nobel;
25 phr of Austin black (carbon black) commercially available from Coal Fillers Inc;
and
0.5 phr or 1 phr of basic compound (B-1): octadecylamine of formula $CH_3(CH_2)_{17}-NH_2$, commercially available as Armeen 18 D from Akzo Nobel.

Results summarized in Table 1 have been obtained by curing/molding specimens for 10 minutes at 170° C. and then post-curing the same for (8+16 hours) at 290° C.

TABLE 1

| Run | Amount of (B-1) in phr | C-Set 48 h @ 300° C. (%) | C-Set 70 h @ 280° C. (%) |
|---|---|---|---|
| 1C | 0 | 39 | 398 |
| 2 | 0.5 | 22 | 21 |
| 3 | 1.00 | 22 | 20 |

Data comprised in Table 1 clearly demonstrate that the addition of basic compound has a significant effect in improving C-set, i.e. sealing properties, at high temperatures.

Tests Carried Out With FKM-B and Basic Compound (B-1)

Curable compounds have been prepared mixing:
100 phr of FKM-B;
as crosslinking agent, 4 phr of a bis-olefin (BO, herein after) of formula $CH_2=CH-(CF_2)_6-CH=CH_2$ (examples 4C and 5C of comparison) or of triallylisocyanurate (TAIC) commercially available as DRIMIX® TAIC from Degussa (example 6C and 7C of comparison);
1.5 phr of neat 2,5-dimethyl-2,5-di(t-butylperoxy)hexane ($C_{16}H_{34}O_4$), commercially available as LUPEROX® 101 from Akzo Nobel;
30 phr of Austin black (carbon black) commercially available from Coal Fillers Inc;
and
0 phr or 1 phr of basic compound (B-1): octadecylamine of formula $CH_3(CH_2)_{17}-NH_2$, commercially available as Armeen® 18D from Akzo Nobel.

Results summarized in Table 2 have been obtained by curing/molding specimens for 10 minutes at 160° C. and then post-curing the same for (1+4 hours) at 230° C. in case of TAIC-containing compounds, or by curing/molding specimens for 10 minutes at 170° C. and then post-curing the same for (8+16 hours) at 290° C. in case of bis-olefin-containing compounds.

TABLE 2

| Run | X-linking agent | Amount of (B-1) in phr | C-Set 48 h @ 300° C. (%) | C-Set 70 h @ 250° C. (%) | C-Set 70 h @ 200° C. (%) |
|---|---|---|---|---|---|
| 4C | BO | 0 | >100 | 94 | 44 |
| 5C | BO | 1 | >100 | 89 | 53 |
| 6C | TAIC | 0 | >100 | 92 | 40 |
| 7C | TAIC | 1 | >100 | 86 | 44 |

Data comprised in Table 2 clearly demonstrate that when the fluoroelastomer comprises an amount of recurring units derived from VDF exceeding 30% moles, the addition of basic compound has no noticeable effect in improving C-set, i.e. sealing properties, at high temperatures, or even said addition can provide for detrimental effect, as expected, because of the sensitivity of $-CF_2-CH_2-$ units to aggressive basic environments.

Test Carried Out With FKM-C and (B-1)

Curable compounds has been prepared mixing:
100 phr of FKM-C;
as cross-linking agent 1.5 phr of a bis-olefin (BO, herein after) of formula $CH_2=CH-(CF_2)_6-CH=CH_2$ (Examples 8C and 9C of comparison) or 2.25 phr of triallylisocyanurate (TAIC) commercially available as DRIMIX® TAIC from Degussa (example 10C and 11C of comparison)
1.2 phr (Ex. 8C and 9C) or 1.0 phr of neat 2,5-dimethyl-2,5-di(t-butylperoxy)hexane ($C_{16}H_{34}O_4$), commercially available as Luperox® 101 liquid from Akzo Nobel;

30 phr of carbon black N990 MT commercially available from Cancarb; and variable amount (0 or 1 phr) of (B-1).

Results summarized in Table 3 have been obtained by curing/molding specimens for 10 minutes at 170° C. and then post-curing the same for (8+16 hours) at 290° C. for compounds comprising bis-olefin (Ex. 8C and 9C), and by curing/molding specimens for 10 minutes at 170° C. and then post-curing the same for (1+4 hours) at 230° C. for compounds comprising TAIC (Ex. 10C and 11C).

TABLE 3

| Run | Cross-linking agent | Amount of (B-1) in phr | C-Set 48 h @ 300° C. (%) | C-Set 70 h @ 200° C. |
|---|---|---|---|---|
| 8C | BO | 0 | 47 | |
| 9C | BO | 1 | 50 | |
| 10C | TAIC | 0 | | 27 |
| 11C | TAIC | 1 | | 48 |

Data summarized in Table 3 further confirm that, when a fluoroelastomer is used comprising an amount of VDF exceeding 30% by moles, there is no advantageous effect in adding the basic compound; even, a detrimental effect can be shown, in particular when using TAIC as crosslinking agent.

The invention claimed is:

1. A fluoroelastomer composition comprising:
   at least one fluoroelastomer (A), said fluoroelastomer (A) comprising iodine and/or bromine atoms and having a backbone comprising:
      recurring units derived from tetrafluoroethylene (TFE);
      recurring units derived from at least one perfluorinated monomer selected from the group consisting of:
         PAVE monomers, wherein PAVE monomers are perfluoroalkylvinylethers complying with formula $CF_2=CFOR_{f1}$ in which $R_{f1}$ is a $C_1$-$C_6$ perfluoroalkyl;
         MOVE monomers, wherein MOVE monomers are perfluoro-oxyalkylvinylethers complying with formula $CF_2=CFOX_0$, in which $X_0$ is (i) a $C_1$-$C_{12}$ perfluorooxyalkyl having one or more ether groups; or (ii) a group of formula $-CF_2OR_{f2}$ in which $R_{f2}$ is a $C_1$-$C_6$ perfluoroalkyl;
      recurring units derived from vinylidene fluoride (VDF) in an amount of up to 30% by moles, with respect to the total moles of recurring units; and
      optionally, recurring units derived from at least one perfluorinated $C_3$-$C_8$ alpha-olefin, in an amount of up to 5% moles;
      optionally, recurring units derived from at least one fluorine-free alpha-olefin, in an amount of up to 10% moles;
   from 0.5 to 5 weight parts, per 100 parts by weight of said fluoroelastomer (A), of at least one polyunsaturated compound;
   from 0.1 to 3 weight parts, per 100 parts by weight of said fluoroelastomer (A), of at least one organic peroxide;
   from 0.1 to 3 weight parts, per 100 parts by weight of said fluoroelastomer (A), of at least one organic base (B) selected from the group consisting of:
      (i) non-aromatic primary amines or amides complying with general formula (B1m) or (B1d):

$R_{bm}$—[C(O)]$_t$—NH$_2$     (B1m)

H$_2$N—[C(O)]$_t$—R$_{dm}$—[C(O)]$_{t'}$—NH$_2$     (B1d)

wherein:
   each of t, t' and t", equal to or different from each other and at each occurrence is zero or 1;
   $R_{bm}$ is a monovalent hydrocarbon non-aromatic group having 12 to 30 carbon atoms;
   $R_{bm}$ is a divalent hydrocarbon non-aromatic group having 6 to 30 carbon atoms; and
(ii) cycloaliphatic secondary or tertiary amines complying with general formula (B2m) or (B2d):

(B2m)

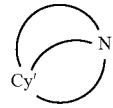

(B2d)

wherein:
   Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto; and
   Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto.

2. The fluoroelastomer composition according to claim 1, wherein said non-aromatic primary amines or amides are selected from the group consisting of:
   octadecylamine of formula $CH_3(CH_2)_{17}$—$NH_2$;
   erucamide of formula $H_2N$—$C(O)$—$(CH_2)_{11}$—$CH=CH$—$(CH_2)_7CH_3$;
   oleamide of formula $H_2N$—$C(O)$—$(CH_2)_7$—$CH=CH$—$(CH_2)_7CH_3$; and
   hexamethylenediamine of formula $H_2N$—$(CH_2)_6$—$NH_2$;
and said cycloaliphatic secondary or tertiary amines are selected from the group consisting of:
   1,8-diazabicycloundec-7-ene (DBU) of formula:

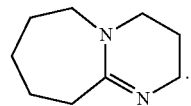 [SMILES: C1CCC2=NCCCN2CC1 ; "."]

3. The fluoroelastomer composition of claim 1, wherein the polyunsaturated compound is a bis-olefin (OF) selected from the group consisting of those complying with formulae (OF-1), (OF-2) and (OF-3):

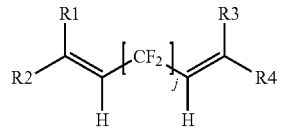

(OF-1)

wherein j is an integer between 2 and 10, and R1, R2, R3, R4, equal or different from each other, are H, F or $C_{1-5}$ alkyl or (per)fluoroalkyl group;

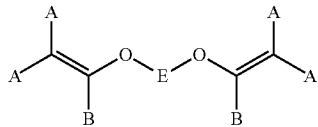
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages;

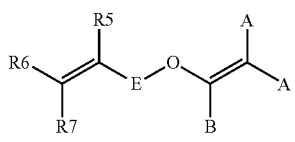
(OF-3)

wherein E, A and B have the same meaning as above defined; R5, R6, R7, equal or different from each other, are H, F or $C_{1-5}$ alkyl or (per)fluoroalkyl group.

4. The fluoroelastomer composition of claim 3, wherein bis-olefin (OF) is a compound of formula (OF1), as above detailed.

5. The fluoroelastomer composition of claim 1, wherein fluoroelastomer (A) comprises iodine and/or bromine atoms in an amount of 0.001 to 10% wt, with respect to the total weight of fluoroelastomer (A).

6. The fluoroelastomer composition of claim 5 wherein the amount of iodine and/or bromine in fluoroelastomer (A) is of at least 0.05% wt, with respect to the total weight of fluoroelastomer (A).

7. The fluoroelastomer composition of claim 3, wherein fluoroelastomer (A) is selected from the group consisting of those having a backbone comprising:
  recurring units derived from TFE in an amount of 30 to 70% moles;
  recurring units derived from at least one perfluorinated monomer selected from the group consisting of:
    PAVE monomers, wherein PAVE monomers are perfluoroalkylvinylethers complying with formula $CF_2=CFOR_{f1}$ in which $R_{f1}$ is a $C_1$-$C_6$ perfluoroalkyl; and
    MOVE monomers, wherein MOVE monomers are perfluoro-oxyalkylvinylethers complying with formula $CF_2=CFOX_0$, in which $X_0$ is (i) a $C_1$-$C_{12}$perfluorooxyalkyl having one or more ether groups; or (ii) a group of formula $-CF_2OR_{f2}$ in which $R_{f2}$ is a $C_1$-$C_6$ perfluoroalkyl;
  in an amount of 25 to 40% moles;
  recurring units derived from VDF in an amount of 1 to 25% moles;
  optionally, recurring units derived from ethylene (E) in an amount from 0 to 5% moles;
  optionally, recurring units derived from hexafluoropropylene (HFP) in an amount from 0 to 5% moles;
  optionally, recurring units derived from at least one bis-olefin (OF).

8. The fluoroelastomer composition of claim 1, wherein said organic peroxide is selected from the group consisting of di-tert-butyl peroxide; 2,5-dimethyl-2,5-bis(tert-butylperoxy)hexane; bis(1,1-diethylpropyl)peroxide; bis(1-ethyl-1-methylpropyl)peroxide; 1,1-diethylpropyl-1-ethyl-1-methylpropyl-peroxide; 2,5-dimethyl-2,5-bis(tert-amylperoxy) hexane; dicumyl peroxide; dibenzoyl peroxide; di-tert-butyl perbenzoate; and bis[1,3-dimethyl-3-(tert-butylperoxy)butyl] carbonate.

9. The fluoroelastomer composition of claim 1, wherein fluoroelastomer (A) is selected from the group consisting of fluoroelastomers having the following monomer compositions (in mol %):
  (i) tetrafluoroethylene (TFE) 40-65%, perfluoroalkyl vinyl ethers (PAVE) 20-50%, vinylidene fluoride (VDF): 10-25%; bis-olefin (OF): 0-5%; hexafluoropropylene (HFP): 0-5%; and
  (ii) tetrafluoroethylene (TFE) 40-65%, perfluoroalkyl vinyl ethers (PAVE) 20-45%, vinylidene fluoride (VDF): 10-25%; ethylene (E): 1-5%; bis-olefin (OF) 0-5%; hexafluoropropylene (HFP): 0-5%.

10. A method for fabricating a shaped article, the method comprising moulding, calendering, or extruding the fluoroelastomer composition of claim 1, such that a shaped article is fabricated.

11. The method according to claim 10, wherein the fluoroelastomer composition is fabricated into the desired shaped article, which is subjected to vulcanization during the processing itself and/or in a subsequent step.

12. A cured article obtained from the fluoroelastomer composition of claim 1.

13. The fluoroelastomer composition of claim 1, wherein the PAVE monomers are monomers of formula $CF_2=CFOR_{f1}$ in which $R_{f1}$ is selected from $-CF_3$, $-C_2F_5$, or $-C_3F_7$.

14. The fluoroelastomer composition of claim 1, wherein the MOVE monomers are monomers of formula $CF_2=CFOX_0$, in which $X_0$ is (i) $-C_2F_5-O-CF_3$; or (ii) a group of formula $-CF_2OR_{f2}$ in which $R_{f2}$ is selected from $-CF_3$, $-C_2F_5$, or $-C_3F_7$.

15. The fluoroelastomer composition of claim 3, wherein j is an integer between 4 and 8.

16. The fluoroelastomer composition of claim 3, wherein E is a $-(CF_2)_m-$ group, with m being an integer from 3 to 5.

17. The fluoroelastomer composition of claim 3, wherein the multifunctional compound is a bis-olefin (OF-2) of formula $F_2C=CF-O-(CF_2)_5-O-CF=CF_2$.

18. The fluoroelastomer composition of claim 4, wherein bis-olefin (OF) is a compound of formula $CH_2=CH-(CF_2)_n-CH=CH_2$, with n being an integer in the range of 4 to 6.

19. The fluoroelastomer composition of claim 6, wherein the amount of iodine and/or bromine in fluoroelastomer (A) is of at least 0.1% weight, with respect to the total weight of fluoroelastomer (A).

20. The fluoroelastomer composition of claim 6, wherein the amount of iodine and/or bromine in fluoroelastomer (A) is of at least 0.15% weight, with respect to the total weight of fluoroelastomer (A).

* * * * *